US009580094B2

(12) United States Patent
Seaton et al.

(10) Patent No.: US 9,580,094 B2
(45) Date of Patent: Feb. 28, 2017

(54) ELECTRONIC BLUE FLAG SYSTEM (71) Applicant: Electro-Motive Diesel, Inc., LaGrange, IL (US)

(72) Inventors: James David Seaton, Westmont, IL (US); Alexander Shubs, Jr., Chicago, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 31 days.

(21) Appl. No.: 14/801,237

(22) Filed: Jul. 16, 2015

(65) Prior Publication Data

US 2017/0015337 A1    Jan. 19, 2017

(51) Int. Cl.
*B60Q 1/00* (2006.01)
*B60R 25/10* (2013.01)
*B61L 27/04* (2006.01)
*B61C 17/12* (2006.01)
*B61H 9/00* (2006.01)
*B60T 13/66* (2006.01)
*B61L 3/00* (2006.01)

(52) U.S. Cl.
CPC .............. *B61L 27/04* (2013.01); *B61C 17/12* (2013.01); *B61H 9/00* (2013.01); *B60L 2200/26* (2013.01); *B60T 13/665* (2013.01); *B61L 3/006* (2013.01); *B61L 3/008* (2013.01)

(58) Field of Classification Search
USPC ................ 701/19–20; 29/407.01; 340/539.1; 246/473 R, 292
See application file for complete search history.

(56) References Cited

U.S. PATENT DOCUMENTS

| 4,637,668 | A  | * | 1/1987  | Kleffman  | B60L 3/00 246/1 R |
| 5,816,541 | A  |   | 10/1998 | Joyce, Jr. | |
| 7,133,272 | B2 | * | 11/2006 | Stanick   | H02J 7/025 361/100 |
| 7,388,483 | B2 | * | 6/2008  | Welles    | B61L 5/02 200/61.45 M |
| 8,585,347 | B2 | * | 11/2013 | Lanigan, Sr. | B66C 19/007 414/342 |

(Continued)

OTHER PUBLICATIONS

Design and control of Unmanned Ground Vehicle using SUV; Jae-Hoon Jang; Myung-Wook Park; Jeong-yeob Lee; Ji-suk Lee ICCAS-SICE, 2009; Year: 2009; pp. 2417-2420.*

(Continued)

*Primary Examiner* — Cuong H Nguyen
(74) *Attorney, Agent, or Firm* — Miller, Matthias & Hull LLP (57) ABSTRACT A system and a control system for selectively preventing movement of a locomotive is disclosed. The control system may comprise a plurality of access control devices for the locomotive, with each access control device including a status indicator, and being configured to activate or deactivate the status indicator based on user input received by any of the plurality of access control devices. Each access control device may also be configured to transmit status data indicative of a status of the locomotive to a locomotive controller, with the status either being a blue flag status or a ready status, wherein at least one of the access control devices is a mobile device not mounted to the locomotive.

20 Claims, 4 Drawing Sheets (56) References Cited

U.S. PATENT DOCUMENTS

| | | | |
|---|---|---|---|
| 2005/0201037 A1* | 9/2005 | Stanick | H02J 7/025 361/160 |
| 2007/0146152 A1* | 6/2007 | Welles | B61L 5/02 340/686.1 |
| 2008/0219827 A1* | 9/2008 | Lanigan | B61B 1/005 414/792.8 |
| 2008/0243301 A1* | 10/2008 | Lanigan | G06Q 10/08 700/214 |
| 2012/0176217 A1 | 7/2012 | Tamaribuchi | |
| 2013/0018531 A1* | 1/2013 | Kumar | B61L 3/006 701/2 |
| 2014/0072398 A1* | 3/2014 | Lanigan, Sr. | B66C 19/007 414/809 |
| 2014/0079528 A1* | 3/2014 | Lanigan, Jr. | G06Q 10/08 414/809 |
| 2014/0188749 A1* | 7/2014 | Lanigan, Sr. | B61B 1/005 705/333 |

OTHER PUBLICATIONS

Kinematics model of unmanned driving vehicle; Xiaoping Ren; Zixing Cai; ; Intelligent Control and Automation (WCICA), 2010 8th World Congress on; Year: 2010; pp. 5910-5914, DOI: 10.1109/WCICA.2010.5554512.*

Research on Absolute Positioning System for High-speed Maglev Train; Cunyuan Qian; Zhengzhi Han; Weida Xie; 2007 International Conference on Mechatronics and Automation; Year: 2007; pp. 922-926, DOI: 10.1109/ICMA.2007.4303669.*

Design and analysis of an intelligent collision avoidance system for locomotives; C. Chellaswamy; S. Arul; L. Balaji; Sustainable Energy and Intelligent Systems (SEISCON 2011), International Conference on; Year: 2011; pp. 833-838, DOI: 10.1049/cp.2011.0481.*

* cited by examiner

ELECTRONIC BLUE FLAG SYSTEM

CROSS-REFERENCE TO RELATED APPLICATION

The present disclosure is related to commonly assigned U.S. patent application Ser. No. 14/688,672 filed on Apr. 16, 2015, and U.S. patent application Ser. No. 14/689,173 filed on Apr. 17, 2015, both of which are incorporated in their entireties herein by reference.

TECHNICAL FIELD

The present disclosure generally relates to safety systems and, more particularly, for such systems utilized in railway applications, and the like.

BACKGROUND

Periodically, locomotives require inspection or repair. In addition, unmanned locomotives sometimes require boarding by personnel. Injury may be caused if a locomotive is moved while it is being inspected or repaired. Injury may also be caused if an unmanned locomotive begins moving while being boarded by personnel. In response to these safety concerns, railway companies have implemented blue flag safety procedures in which personnel working on a locomotive are required to place a physical blue flag on the locomotive. When such a flag is placed on the locomotive, no one is permitted to move the locomotive.

U.S. Pat. No. 5,816,541 issued Oct. 6, 1998 (the '541 patent) discloses a method of preventing movement of a locomotive while personnel are working on the locomotive. The method includes placing the brakes of the locomotive under the control of a card reading control box, and providing personnel employed to work on the locomotive with identification cards readable by the box. Each worker inserts his or her card in the box before working on the locomotive. The control box reads the cards and in response thereto maintains the brakes of the locomotive at full service until the personnel have left the locomotive and the control box is cleared. The application of this system has drawbacks. A better system is needed.

SUMMARY OF THE DISCLOSURE

In accordance with one aspect of the disclosure, a control system for selectively preventing movement of a locomotive is disclosed. The locomotive may include a brake system, a power system, and a wheel assembly in operable communication with the brake system and the power system. The brake system may be configured to release or apply braking force to the wheel assembly, and the power system may be configured to provide power to the wheel assembly. The control system may comprise a plurality of access control devices for the locomotive, with each access control device including a status indicator, and being configured to activate or deactivate the status indicator based on user input received by any of the plurality of access control devices. Each access control device may also be configured to transmit status data indicative of a status of the locomotive to a locomotive controller, with the status either being a blue flag status or a ready status, wherein at least one of the access control devices is a mobile device not mounted to the locomotive. The locomotive controller may also be in communication with the plurality of access control devices, with the brake system and the power system being configured to display the status on the mobile device, and if the status is the blue flag status, prevent power from being applied to the wheel assembly and block release of the brake from the wheel assembly.

In accordance with another aspect of the disclosure, a method of selectively preventing movement of a locomotive is disclosed. The locomotive may include a brake system, a power system, and a wheel assembly in operable communication with the brake system and the power system. The brake system may be configured to release or apply braking force to the wheel assembly, and the power system may be configured to provide power to the wheel assembly. The method may comprise providing a plurality of access control devices for the locomotive, with each access control device of the plurality of access control devices including a status indicator, and wherein at least one of the access control devices is a mobile device not mounted to the locomotive. The method may further comprise activating or deactivating the status indicator on each access control device based on user input received by any of the plurality of access control devices, transmitting by the access control device status data indicative of a status of the locomotive to a locomotive controller, the status either a blue flag status or a ready status, displaying the status on the mobile device, and if the status is the blue flag status, preventing power from being applied to the wheel assembly and blocking release of brake force from the wheel assembly.

In accordance with a further aspect of the disclosure, a control system for selectively preventing movement of a locomotive is disclosed. The locomotive may include a brake system, a power system, and a wheel assembly in operable communication with the brake system and the power system. The brake system may be configured to release or apply braking force to the wheel assembly, and the power system may be configured to provide power to the wheel assembly. The control system may comprise a plurality of access control devices for the locomotive, with each access control device of the plurality of access control devices including a status indicator. Each access control device may be configured to activate or deactivate the status indicator based on user input received by any of the plurality of access control devices, and transmit data to a locomotive controller based on the user input, wherein at least one of the access control devices is a mobile device not mounted to the locomotive. The data is indicative of a status of the locomotive, with the status either being a blue flag status or a ready status. The control system may further comprise a locomotive controller in communication with the plurality of access control members, the brake system, the power system, and a locomotive signaling system and a main signaling system. The locomotive controller may be configured to receive status data from any one of the plurality of access control devices, display the status on an output interface, and if the status is the blue flag status, prevent power from being applied to the wheel assembly and block release of braking force from the wheel assembly, and if the status is the blue flag status and the locomotive is unmanned, transmit a signal that prevents automatic movement of the locomotive.

DETAILED DESCRIPTION

Figure 1:
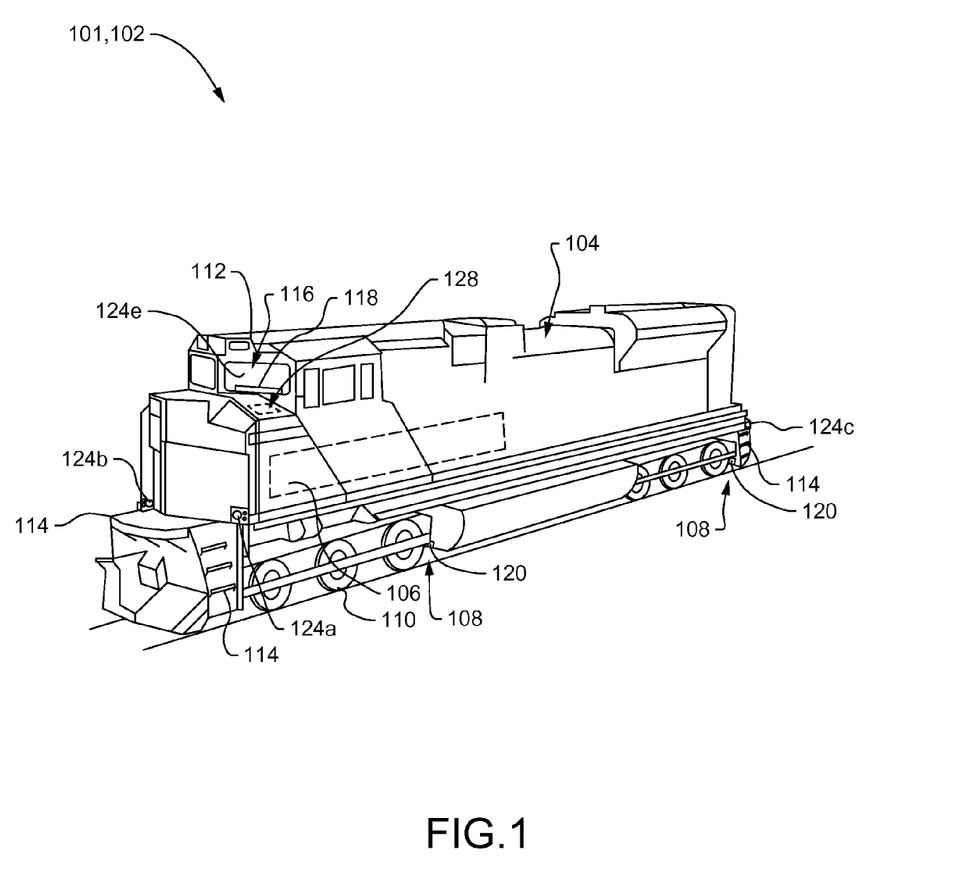
FIG. 1 is a perspective view of an exemplary locomotive with which the system of FIG. 2 may be used.

FIG. 1 illustrates one example of a machine or vehicle (either, a "machine" 100) that incorporates the features of the present disclosure. In the exemplary embodiment, the machine 100 is a locomotive 102. The locomotive 102 may include a frame 104, a power system 106 mounted to the frame 104, a brake system 108, and a wheel assembly 110 in operable communication with the power system 106 and the brake system 108. The frame 104 may include a cab assembly 112, and one or more access structures 114 such as stairs, or the like. The cab assembly 112 may define an operator compartment 116 containing a plurality of control devices 118 such as throttle hands, controls or other types of display and input devices that control or monitor the operation of the locomotive 102 or provide input regarding the operation, health, status of the locomotive 102. In one embodiment, the access structures 114 may be disposed on both sides of the front and rear of each locomotive 102. The power system 106 may be any appropriate power system configured to generate and to provide power to operate the locomotive 102. The power system 106 may include a drive system (not shown) that that propels the locomotive 102 by driving the wheel assembly 110. The brake system 108 includes one or more brakes 120 and may be any appropriate brake system configured to release or apply braking force to the wheel assembly 110. When braking force is applied, movement of the wheel assembly 110 is retarded or prevented by application of the brakes 120 to the wheel assembly 110.

The machine 100 (in the exemplary embodiment, the locomotive 102) may be manned, unmanned or semi-autonomous. Manned machines 100 have a human operator controlling the actions of the machine 100. Whereas, the movement and operations of an unmanned machine 100 may be controlled by one or more controllers or the like, onboard or remote, instead of a human operator. Semi-autonomous machines 100 may have one or more controllers that control some of the operations of the machine 100 and a human may control other operations of the machine 100. Such human control may be via a control device 118 such as an operator control screen 132, or the like, disposed within the operator compartment 116 or disposed remote from the machine 100.

Figure 2:
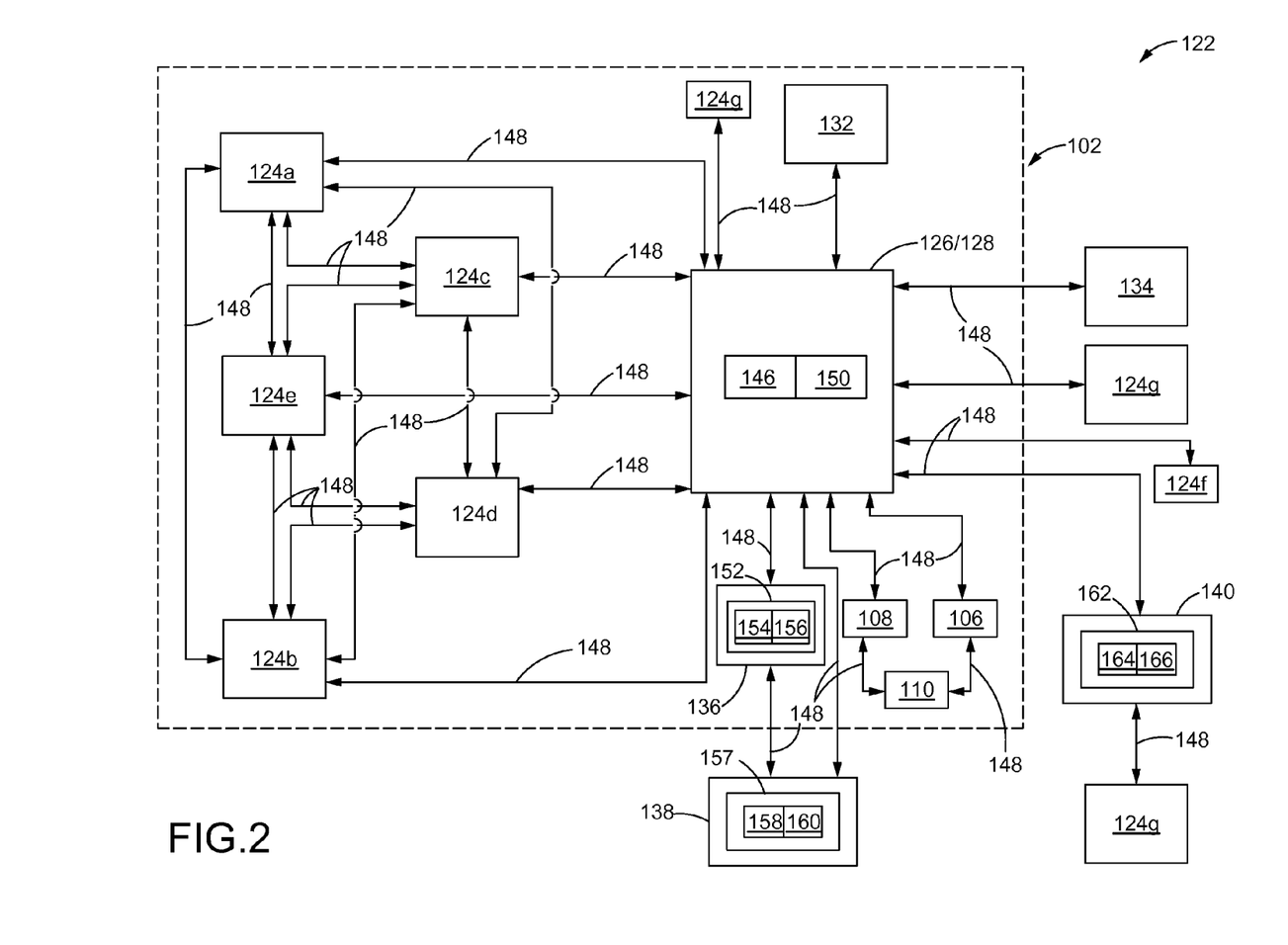
FIG. 2 is a general schematic of an exemplary embodiment of a control system constructed in accordance with the teachings of this disclosure.

Referring now to the drawings, and with specific reference to FIG. 2, there is shown a schematic diagram of an exemplary embodiment of a control system in accordance with the present disclosure and generally referred to by reference numeral 122. While the following detailed description and drawings are made with reference to the exemplary control system 122 utilized for selectively preventing movement of the locomotive 102 in a railway application, the teachings of this disclosure may be employed in other applications in which it is desired to prevent movement of the machine 100 during inspection or maintenance of the machine 100 or, in the case of unmanned machines 100, during personnel boarding or disembarking from such.

The exemplary control system 122 may comprise a plurality of access control devices 124 and a machine controller 126. In this embodiment, the machine controller 126 is a locomotive controller 128 that may be disposed on the locomotive 102. The control system 122 may further include one or more operator control screens 132 and one or more output interfaces 134. The control system 122 may also further include a locomotive signaling system 136, a main signaling system 138 and a master locomotive system 140.

Some of the access control devices 124 may be mounted on the outside of the locomotive 102. For example, in the embodiment illustrated in FIGS. 1-2, access control devices 124a, 124b, 124c, 124d may be mounted on the outside of the locomotive 102, proximal to the access structures 114 (stairs) at the front and rear of the locomotive 102. Some access control devices 124 may be mounted inside the operator compartment 116 (see for example, access control device 124e in FIG. 2). Some access control devices 124f may be remote from the locomotive 102. Other access control devices 124g may be mobile devices (for example, smart phones, lap top computers, tablet computers, etc.). Such remote devices and mobile devices may access the control system 122 via a web page, or the like. In some embodiments, users may have to login with a password in order to activate or deactivate a status indicator 130 (as discussed below).

Each of the access control devices 124 includes a status indicator 130. Each access control device 124 may further include an activation mechanism 142 and a deactivation mechanism 144. In some embodiments, the activation mechanism 142 and the deactivation mechanism 144 may be a button, switch, or touch screen sensory area configured to receive user input. In other embodiments, the activation mechanism 142 and deactivation mechanism 144 may be the same physical mechanism that is toggled or switched between an activated state and a deactivated state.

The status indicator 130 may be a light (blue colored or otherwise, or a representation displayed on a screen, (e.g., a picture, a symbol, an image, an icon, a color, or combinations thereof) that is activated (e.g., turned on, highlighted or displayed) when the activation mechanism 142 is triggered, and that is deactivated (e.g., turned off, darkened/with highlighting removed, or removed entirely from a display) when the deactivation mechanism 144 is triggered. Each of the access control devices 124 may be in communication with each other and the locomotive controller 128, either directly or indirectly.

Figure 3:
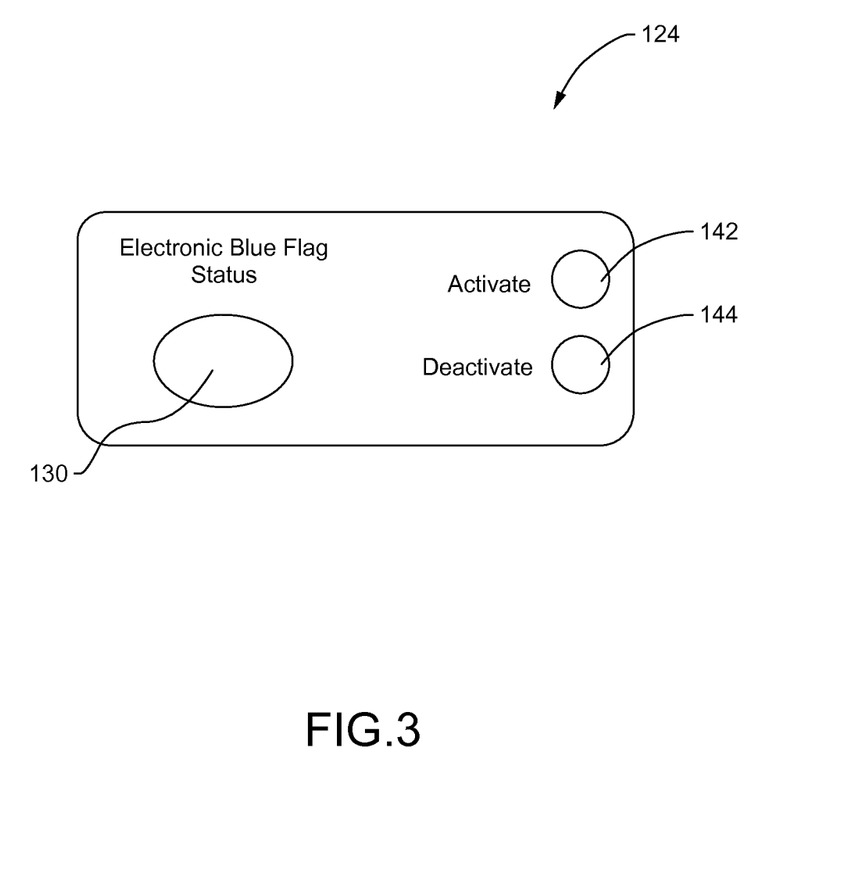
FIG. 3 is a general schematic of an embodiment of an exemplary access control device.

FIG. 3 illustrates one embodiment of an access control device 124 including a status indicator 130. In the embodiment of FIG. 3, the access control device 124 has an activation mechanism 142 and a deactivation mechanism 144.

Each access control device 124 is configured to activate or deactivate its status indicator 130 based on the user input received by any of the plurality of access control devices 124 associated with the locomotive 102. For example, triggering or activating the activation mechanism 142 on a first of the plurality of access control devices 124 will activate the status indicator 130 on the first access control device 124 and all of the other access control devices 124 in the plurality. Similarly, deactivating or triggering the deactivation mechanism 144 on the first access control device 124 will deactivate the status indicator 130 on the first access control device 124 and all of the other access control devices 124 in the plurality.

Each access control device 124 is further configured to transmit status data indicative of a status of the locomotive 102 to the locomotive controller 128 when the activation mechanism 142 or the deactivation mechanism 144 is activated or triggered. The status may be either a blue flag status or a ready status. A blue flag status indicates that the locomotive 102 is under inspection or maintenance and should not be moved. A ready status indicates that the locomotive 102 is available for operation. A blue flag status may occur when the activation mechanism is activated/triggered. A ready status may occur when the deactivation mechanism is activated/triggered.

The operator control screen 132 may be user interface in communication with the locomotive controller 128. The operator control screen 132 may be on-board the locomotive 102 or remote from the locomotive 102 and may be configured to received user commands to control the locomotive 102 and to display the locomotive operation, health, and/or maintenance parameters and results. The operator control screen 132 may also be configured to display the current and past status of the locomotive 102, namely whether the locomotive 102 is currently in a blue flag status or a ready status, or the historical past dates and times when the locomotive 102 was in a blue flag status or a ready status. The status indicator 130 may be displayed on the operator control screen 132 so that an operator or user can determine whether the locomotive 102 is currently in a blue flag status or a ready status.

The output interface 134 may be a display, mobile device, graphical user interface, printer, or like devices configured to display, log, print or otherwise output the current status (blue flag status or ready status) of each locomotive 102, and/or historical status information such as the dates and times of past blue flag statuses and ready statuses for each locomotive 102. In some embodiments, such output may be accessed via web pages. Depending on the application, some output interfaces 134 may also include an access control device 124 that is configured to receive input to activate or deactivate a status indicator 130 and to display the status indicator 130 when activated and when deactivated. The output interface 134 may be, directly or indirectly, in communication with the locomotive controller 128. The output interface 134 may be remote from the locomotive 102.

The locomotive controller 128 may include a processor 146 and a memory component 150. The locomotive controller 128 may be in communication (directly or indirectly), through communication links 148, with the plurality of access control devices 124, the operator control screen 132, the output interface 134, the locomotive signaling system 136, the brake system 108, the wheel assembly 110, the power system 106, master locomotive system 140 and the main signaling system 138.

The communication links 148 may be hardware and/or software that enables the transmission and receipt of data messages through a direct data link or a wireless communication link. The wireless communication link may include, for example, satellite, radio (voice and/or data), cellular, infrared, Ethernet, or the like.

The processor 146 may be a microprocessor or other processor as known in the art. The processor 146 may execute instructions and generate control signals for preventing/allowing power from being applied to the wheel assembly 110 and blocking/allowing release of braking force (by the brake system 108) from the wheel assembly 110. Such instructions may be read into or incorporated into a computer readable medium, such as the memory component 150 or provided external to the processor 146. In alternative embodiments, hard wired circuitry may be used in place of, or in combination with, software instructions to implement a control method.

The term "computer readable medium" as used herein refers to any non-transitory medium or combination of media that participates in providing instructions to the processor 146 for execution. Such a medium may comprise all computer readable media except for a transitory, propagating signal. Common forms of computer-readable media include any medium from which a computer processor 146 can read.

The locomotive controller 128 is not limited to one processor 146 and memory component 150. The locomotive controller 128 may be several processors 146 and memory components 150. The locomotive controller 128 may be configured to receive status data from the access control devices. Such status data may be stored in the memory component 150.

The locomotive controller 128 may be configured to transmit status data and historical status information (for the locomotive 102) to the operator control screen 132, output interfaces 134, access control devices 124, the locomotive signaling system 136, the main signaling system 138 and the master locomotive system 140. Historical status information may include the dates and times of past blue flag statuses and ready statuses for the locomotive 102. The locomotive controller 128 may be configured to transmit a signal to the locomotive signaling system 136, when a locomotive 102 has (is under) a blue flag status, to block movement of the locomotive 102 regardless of whether movement authority has been granted and received (by another system or controller) to move the locomotive 102. The locomotive controller 128 may be configured to further transmit information to the main signaling system 138 to prevent the main signaling system 138 from granting movement authority (authority to move in the railway system) to the locomotive 102 when the locomotive's status is a blue flag status. The locomotive controller 128 may be configured to transmit a signal to the locomotive signaling system 136, when a locomotive 102 has (is under) a ready status or has transitioned from a blue flag status to a ready status, to allow movement of the locomotive 102. The locomotive controller 128 may be configured to further transmit information to the main signaling system 138 to allow the main signaling system 138 to grant movement authority (authority to move in the railway system) to the locomotive 102 when the locomotive's status is a ready status or has just transitioned from a blue flag status to a ready status.

The locomotive signaling system 136 may include a signaling controller 152 configured to prohibit movement of the locomotive 102 (in manned, unmanned or semi-autonomous locomotives 102) based on a signal received from the locomotive controller 128 that indicates that the locomotive 102 has an activated blue flag status, and to allow movement of the locomotive 102 (in manned, unmanned or semi-autonomous locomotives 102) based on a signal received from the locomotive controller 128 that indicates that the locomotive 102 has an activated ready status. The locomotive signaling system 136 may be disposed on the locomotive 102. Such locomotive signaling system 136 may be in communication with the locomotive controller 128 and with other control systems involved in the operation of the locomotive 102.

The signaling controller 152 may include one or more signaling processors 154 and signaling memory components 156. The signaling controller 152 may be operably connected through communication links 148 to the locomotive controller 128. The signaling processor 154 may be a microprocessor or other processor as known in the art. The signaling processor 154 may execute instructions and generate control signals to move the locomotive 102 or prohibit movement of the locomotive 102.

The main signaling system 138 may be configured to monitor the plurality of locomotives 102 operating in a rail system and to authorize or deny authorization for movement of each locomotive 102. The main signaling system 138 may be in communication with the locomotive controller 128 via communication links 148. The main signaling system 138 may include a main controller 157 that includes one or more main processors 158 and one or more main memory components 160. The main processor 158 may be a microprocessor or other processor as known in the art and may execute instructions and generate control signals for authorizing or denying movement for a locomotive 102.

The master locomotive system 140 may be connected to the locomotive controller 128 via communication links 148 and may be configured to monitor the health and status of a plurality of locomotives 102. The master locomotive system may receive status data and historical status information from the locomotive controller 128.

The master locomotive system 140 may include a master controller 162 that includes one or more main processors 164 and one or more main memory components 166. The main processor 164 may be a microprocessor or other processor as known in the art and may execute instructions and generate control signals for transmitting such status data and historical status information to output interfaces 134 for display.

It is also important to note that foregoing electronic blue flag functionality is designed to work on trailing units in both lead and remote consists. As such, an electronic blue flag indication will be MU (multiple unit) trainlined and monitored by the lead locomotive. In other words, a signal is transmitted when it is passed through a MU plug between the locomotives in the consist. In a remote consist (for distributed power operation), an electronic blue flag is provided to the remote lead as well. The blue flag signal can then be passed by a locomotive operation back office (such as EMD Intellitrain™), or an ECPB (electronically controlled pneumatic brake) train line connection. For further information and disclosure with respect to EMD Intellitrain™ and ECPB operation, reference is made to commonly assigned U.S. patent application Ser. Nos. 14/689,173 and 14/688,672, respectively, both of which are incorporated in their entireties herein by reference.

INDUSTRIAL APPLICABILITY

In operation, the present disclosure can find applicability in any number of industrial applications, such as but not limited to rail and locomotive operation. As opposed to the prior art which does not provide for remote viewing or control of blue flag status, the present disclosure does. In addition, while the prior art is not linked to a locomotive signaling system, the present disclosure is so linked. Moreover, the present disclosure, contrary to the prior art, has multiple access points to allow safe boarding procedures from each physical access location on the locomotive, and can be deactivated from with the locomotive cab, a significant feature in allowing safe use in conjunction with autonomous operation.

Figure 4:
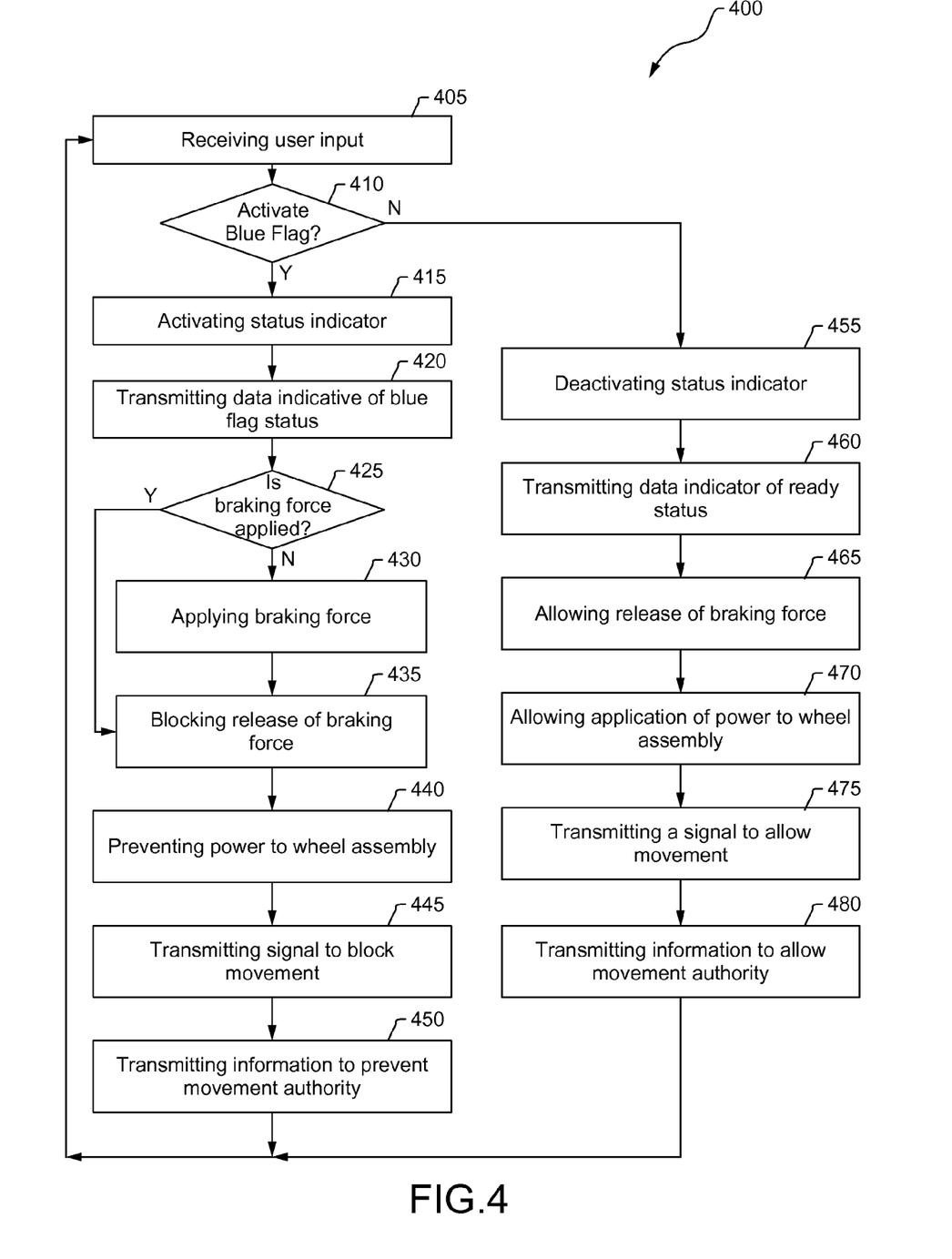
FIG. 4 is a flowchart illustrating exemplary steps of a method of preventing movement of a locomotive in accordance with the teachings of this disclosure.

Referring now to FIG. 4, an exemplary flowchart is illustrated showing sample steps which may be followed to prevent movement of a machine 100, such as a locomotive 102. The method 400 may be practiced with more or less than the number of steps shown and is not limited to the order shown.

Block 405 of the method disclosed herein includes receiving user input by an access control device 124.

In Block 410 of the method, the access control device 124 determines whether the user input is to activate a blue flag status, or to deactivate the blue flag status and activate the ready status. If the input is to activate the blue flag status, the method proceeds to block 415. If the input is to deactivate the blue flag status (and activate the ready status), the method proceeds to block 455. In one embodiment, activation of the blue flag status may occur by activation or triggering, by the user, the activation mechanism 142. In an embodiment, deactivation of the blue flag status (and activation of the ready status) may occur by activation or triggering the deactivation mechanism 144 by the user.

In block 415, the status indicator 130 is activated on each of the plurality of access control devices 124. Alternatively, in some embodiments, the status indicator 130 may be activated on the access control device 124 into which the user input was received and then, after the locomotive controller 128 receives the status data in step 420, the locomotive controller 128 transmits instructions to the remaining access control devices 124 in the plurality to activate their respective status indicators 130.

Block 420 of the method is transmitting, by the access control device 124, status data to the locomotive controller 128.

Block 425 includes determining by the locomotive controller 128 if braking force is currently applied to the wheel assembly 110. If yes, the process proceeds to block 435. If no, the process proceeds to block 430. Block 430 of the method is applying braking force to the wheel assembly 110.

Block 435 includes blocking the release of braking force by the braking system 108.

Block 440 includes preventing application of power by the power system 106 to the wheel assembly 110.

Block 445 includes transmitting, by the locomotive controller 128, a signal to the locomotive signaling system 136 to block movement of the locomotive 102 (because the locomotive 102 has an activated blue flag status).

Block 450 includes transmitting, by the locomotive controller 128 or the locomotive signaling system 136, directly or indirectly, information to the main signaling system 138 to prevent movement authority from being granted to the locomotive 102 (because the locomotive 102 has an activated blue flag status). The process then returns to block 405.

If in block 410, the user input was to deactivate the blue flag status (activate the ready status), the process proceeds to block 455 where status indicator on each of the plurality of access control devices 124 is deactivated. Alternatively, in some embodiments, the status indicator 130 may be deactivated on the access control device 124 into which the user input was received and then, after the locomotive controller 128 receives the status data in block 460, the locomotive controller 128 transmits instructions to the remaining access control devices 124 in the plurality to deactivate their respective status indicators 130.

Block 460 includes transmitting status data by the access control device 124 to the locomotive controller 128.

Block 465 includes allowing, by the locomotive controller 128, the release of the braking force (by the brake system 108) from the wheel assembly 110, when release is requested by a locomotive 102 operator.

Block 470 includes allowing application of power by the power system 106 to the wheel assembly 110, when power is requested by the locomotive 102 operator.

Block 475 includes transmitting, by the locomotive controller 128, a signal to the locomotive signaling system 136 to allow movement (operator requested or automatic/autonomous) of the locomotive 102 because the locomotive 102 is in the ready status.

Block 480 includes transmitting, by the locomotive controller 128 or the locomotive signaling system 136, information to the main signaling system 138 to allow movement authority to be granted to the locomotive 102. The process then returns to block 405.

The features disclosed herein may be particularly beneficial for use with autonomous, semi-autonomous and manned machines 100. In addition, the features disclosed herein may be particularly beneficial when it is desired to prevent movement of the machine 100 during inspection or maintenance of the machine 100 or, in the case of unmanned machines 100, during boarding or disembarking from such.

What is claimed is:

1. A control system for selectively preventing movement of a locomotive, the locomotive including a brake system, a power system, and a wheel assembly in operable communication with the brake system and the power system, the brake system configured to release or apply braking force to the wheel assembly, the power system configured to provide power to the wheel assembly, the control system comprising:
   a plurality of access control devices for the locomotive, each access control device of the plurality of access control devices including a status indicator, each access control device configured to activate or deactivate the status indicator based on user input received by any of the plurality of access control devices, and configured to transmit status data indicative of a status of the locomotive to a locomotive controller, the status either a blue flag status or a ready status, wherein at least one of the access control devices is a mobile device not mounted to the locomotive;
   the locomotive controller in communication with the plurality of access control devices, the brake system and the power system and configured to:
   display the status on the mobile device; and
   if the status is the blue flag status, prevent power from being applied to the wheel assembly and block release of the brake from the wheel assembly.

2. The control system of claim 1, wherein the locomotive is an unmanned locomotive.

3. The control system of claim 2, in which the locomotive controller is further configured to transmit a signal that prevents automatic movement of the locomotive if the status is the blue flag status.

4. The control system of claim 1, in which the locomotive controller is further configured to transmit information that blocks movement authority from being granted to the locomotive if the status is the blue flag status.

5. The control system of claim 1, in which the locomotive controller is further configured to, if the status is the ready status, allow power to be applied to the wheel assembly and allow release of braking force from the wheel assembly.

6. The control system of claim 1, in which the locomotive controller is configured to display the status on a remote output interface.

7. The control system of claim 1, in which the access control device has an activation mechanism and a deactivation mechanism.

8. The control system of claim 1, wherein the mobile device is smart phone.

9. A method for selectively preventing movement of a locomotive, the locomotive including a brake system, a power system, and a wheel assembly in operable communication with the brake system and the power system, the brake system configured to release or apply braking force to the wheel assembly, the power system configured to provide power to the wheel assembly, the method comprising:
   providing a plurality of access control devices for the locomotive, each access control device of the plurality of access control devices including a status indicator, wherein at least one of the access control devices is a mobile device not mounted to the locomotive;
   activating or deactivating the status indicator on each access control device based on user input received by any of the plurality of access control devices;
   transmitting by the access control device status data indicative of a status of the locomotive to a locomotive controller, the status either a blue flag status or a ready status;
   displaying the status on the mobile device; and
   if the status is the blue flag status, preventing power from being applied to the wheel assembly and blocking release of brake force from the wheel assembly.

10. The method of claim 9, further comprising transmitting a signal that prevents automatic movement of the locomotive if the status is the blue flag status and the locomotive is an unmanned locomotive.

11. The method of claim 10, further comprising transmitting information that blocks movement authority from being granted to the locomotive if the status is the blue flag status.

12. The method of claim 9, further comprising, if the status is the ready status, allowing, by the locomotive controller, power to be applied to the wheel assembly and allowing release of braking force from the wheel assembly.

13. The method of claim 9, further comprising displaying the status on an operator control screen in communication with the locomotive controller.

14. The method of claim 9, wherein the mobile device is smart phone.

15. The method of claim 9, wherein a first of the access control devices is disposed proximal to the rear of the locomotive, a second of the access control devices is disposed proximal to the front of the locomotive and a third access control device is disposed inside an operator compartment of the locomotive.

16. A control system for selectively preventing movement of a locomotive, the locomotive including a brake system, a power system, and a wheel assembly in operable communication with the brake system and the power system, the brake system configured to release or apply braking force to the wheel assembly, the power system configured to provide power to the wheel assembly, the control system comprising:
   a plurality of access control devices for the locomotive, each access control device of the plurality of access control devices including a status indicator, each access control device configured to activate or deactivate the status indicator based on user input received by any of the plurality of access control devices, and transmit data to a locomotive controller based on the user input, wherein at least one of the access control devices is a mobile device not mounted to the locomotive, the data indicative of a status of the locomotive, the status either a blue flag status or a ready status; and
   the locomotive controller in communication with the plurality of access control members, the brake system and the power system, and a locomotive signaling system and a main signaling system, the locomotive controller configured to:

receive status data from any one of the plurality of access control devices;

display the status on an output interface;

if the status is the blue flag status, prevent power from being applied to the wheel assembly and block release of braking force from the wheel assembly; and if the status is the blue flag status and the locomotive is unmanned, transmit a signal that prevents automatic movement of the locomotive.

17. The control system of claim 16, in which the locomotive controller is further configured to, if the status is the ready status, allow power to be applied to the wheel assembly and allow release of braking force from the wheel assembly.

18. The control system of claim 17, wherein activation of the ready status is received by the mobile device.

19. The control system of claim 16, in which the locomotive controller is further configured to transmit a signal to the locomotive signaling system that prevents automatic movement of the locomotive by the locomotive signaling system if the status is the blue flag status.

20. The control system of claim 16, in which the locomotive controller is further configured to transmit information to a main signaling system that blocks movement authority from being granted by the main signaling system to the locomotive if the status is the blue flag status.

* * * * *